Patented Sept. 5, 1950

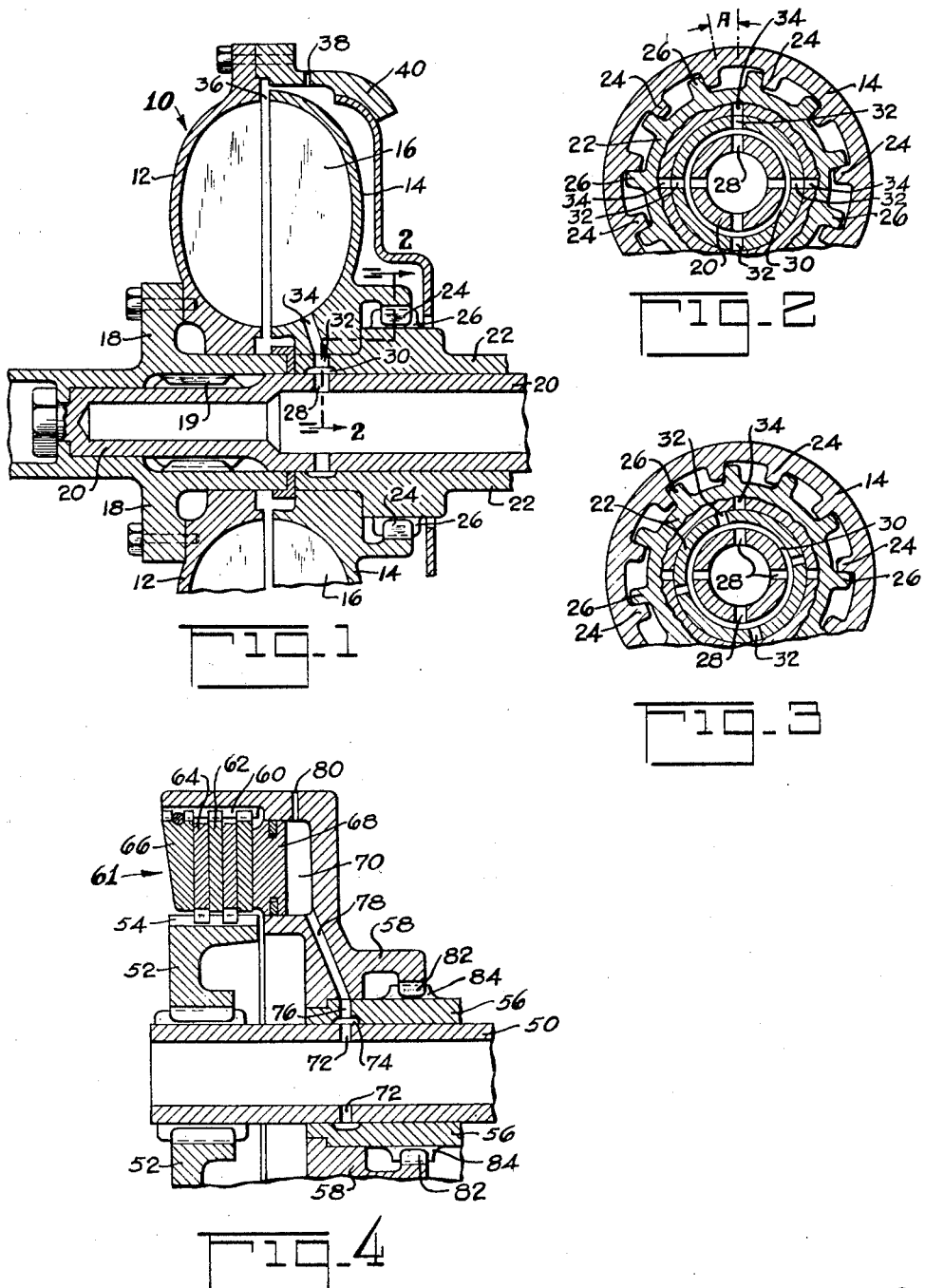

2,521,117

UNITED STATES PATENT OFFICE 2,521,117

ONE-WAY DRIVES WITH HYDRAULICALLY LOADABLE COUPLING

George B. Du Bois and Roland B. Ungerer, Fairlawn, N. J., assignors to Wright Aeronautical Corporation, a corporation of New York Application November 9, 1946, Serial No. 709,068

6 Claims. (Cl. 60—54)

1

This invention relates to one-way drive or torque transmitting means and is particularly directed to a torque transmitting means including a hydraulically loadable coupling together with automatic means for rendering the coupling capable of transmitting torque in but one direction.

The invention may be used with any form of hydraulically loadable coupling in which a torque transmitting connection is provided through the coupling between a pair of members when liquid is supplied to the coupling, and when the coupling empties it is rendered incapable of transmitting torque. One object of the invention is to provide a novel means responsive to reversal of the direction of the torque between said members for causing the coupling to empty. The coupling is drivably connected with a pair of drive transmitting elements which are relatively movable from one limiting position to another upon reversal of the direction in which torque is transmitted therebetween and through the coupling. A further object of the invention comprises means for controlling the amount of liquid within the coupling in response to relative movement of said elements.

Specifically, the invention comprises a hydraulic coupling having inlet and outlet passages, the coupling liquid continually draining out through the outlet passage while the coupling is transmitting torque so that liquid must be continually supplied to the coupling inlet passage to keep it full. Accordingly, the quantity of liquid within the coupling can be varied by controlling the relative size of its inlet and outlet passages. In accordance with the present invention, a relatively rotatable torque transmitting member is serially connected with the coupling in such a manner that said member occupies a first relative rotative position, to open said inlet passage, when torque is transmitted through said coupling and member in one direction and when the direction in which said torque is transmitted tends to reverse, said member automatically rotates relative to the coupling to close said inlet passage. Upon closure of said inlet passage, said coupling automatically empties to disconnect the driving connection therethrough.

Other objects of the invention will become apparent upon reading the annexed detailed description in connection with the drawing in which:

Figure 1 is an axial sectional view through a transmission embodying the invention;

Figure 2 is a sectional view taken along line 2—2 of Figure 1;

2

Figure 3 is a view similar to Figure 2 showing the parts and position when the torque reverses; and Figure 4 is an axial sectional view of a modification of the invention.

Referring first to Figures 1 to 3 of the drawing, a conventional hydraulic coupling 10 comprises rotatable coupling members 12 and 14 providing an annular chamber 16 therebetween for the coupling liquid. The coupling members 12 and 14 are provided with the usual vanes extending into the chamber 16 so that the liquid within the coupling transmits torque from one of the members 12 or 14 to the other of these members. The hydraulic coupling member 12 is bolted or otherwise secured to the hub member 18 which, in turn, is splined at 19 to a drive transmitting shaft 20. The other coupling member 14 is piloted on a shaft 22 and is provided with splines 24 interfitted with splines 26 on the shaft 22 to drivably connect the shaft 22 with the coupling member 14. With the construction so far described, when the coupling chamber 16 is full of liquid, torque may be transmitted therethrough from the shaft 20 to the shaft 22 or in the reverse direction.

Liquid is supplied to the coupling 10 through the hollow shaft 20. For this purpose, holes 28 and an annulus 30 provide a continuous supply of oil at annulus 30 from the interior of the shaft 20. The hydraulic coupling member 14 is provided with substantially radial holes 34 adapted to aline with radial holes 32 in the shaft 22 communicating with the annulus 30. When the holes 32 and 34 are in alinement, as illustrated in Figure 2, liquid can be supplied to the coupling chamber 16 from the interior of the shaft 20. Liquid drains from the coupling chamber 16 through an annular clearance 36 between the outer periphery of the coupling members 12 and 14 and thence through one or more restricted openings 38 provided in a cover member 40 rigid with a coupling member 12. With this construction, during coupling rotation, the centrifugal force acting on the liquid within the coupling helps the coupling liquid to discharge through the restricted openings 38. The arrangement is such that, when the passages 32 and 34 are in alinement, liquid is supplied to the coupling at a rate sufficient to keep the coupling full, whereby the coupling runs with a minimum amount of slip between its members 12 and 14.

As illustrated in Figures 2 and 3, the splines 24 and 26 provide a lost-motion driving connection between the coupling member 14 and the shaft 22 permitting limited relative rotation between the coupling member 14 and the shaft 22 equal to the angle A. If torque is transmitted counterclockwise from the coupling member 14 to the shaft 22 then the member 14 and shaft 22 and their splines 24 and 26 have the relative position illustrated in Figure 2 and the holes 32 and 34 are alined. Accordingly, the liquid inlet passage to the coupling is fully open and the coupling runs full of liquid to transmit torque from the shaft 20 to the shaft 22. However, if for some reason, the shaft 22 should overrun—that is, tend to drive the shaft 20—thereby reversing the direction in which torque is transmitted between the shafts 20 and 22, the splines 26 will rotate through the angle A relative to the splines 24 to engage the other side of the splines 24 thereby moving the holes out of alinement with the holes 34 (as illustrated in Figure 3) to shut off the supply of liquid to the coupling. As a result, the coupling liquid quickly drains out through the outlet passage 38 with the help of the centrifugal force acting on the liquid, whereby the slip between the coupling members 12 and 14 is a maximum.

With this lost motion construction, torque can be transmitted in a normal direction from the shaft 20 through the coupling 10 to the shaft 22 and whenever the shaft 22 tends to overrun the shaft 20, the coupling automatically empties to prevent transmission of torque in the reverse direction—that is, from the shaft 22 to the shaft 20.

As described, the shaft 20 normally is the driving shaft and the shaft 22 normally is the driven shaft and the coupling inlet passage is controlled by relative rotation between a pair of drive transmitting members on the driven side of the coupling. However, the coupling inlet passage can also be controlled by relative rotation of a pair of drive transmitting members on the driving side instead of the driven side of the coupling. Thus, the shaft 22 may normally drive the coupling 10 and the shaft 20 in a clockwise direction with the coupling member 14, the shaft 22 and their splines 24 and 26 occupying the relative positions illustrated in Figure 2. Under these conditions, if the shaft 20 should tend to overrun, the coupling member 14 will rotate through the angle A relative to the shaft 22 to the position illustrated in Figure 3, thereby cutting off the supply of liquid to the coupling and interrupting the reverse drive.

In Figures 1 to 3, the invention has been illustrated in connection with a conventional form of hydraulic coupling in which torque is transmitted through the coupling liquid itself. The invention is also applicable to other forms of hydraulically loadable couplings, as, for example, to a conventional hydraulically loadable friction clutch as illustrated in Figure 4.

In Figure 4, a shaft 50 is splined to a drum 52 having a plurality of external splines 54 and a second shaft 56 is splined to a drum 58 having a plurality of internal splines 60 facing the external splines 54. A friction clutch 61 comprises a plurality of plates 62 alternately disposed alongside of plates 64, with the plates 62 splined to the external splines 54 and the plates 64 splined to the internal splines 60. The plates 62 and 64 are adapted to be frictionally clamped together and, for this purpose, are confined between an end stop 66 and an annular piston 68 slidable within an annular chamber 70 formed in the drum 58. A suitable liquid, such as engine lubricating oil, is supplied to the chamber 70 from the interior of the shaft 50 via radial holes 72 in the shaft 50, annulus 74 and radial holes 76 in the shaft 56 and holes 78 in the drum 58. The chamber 70 is also provided with one or more restricted discharge openings 80 or, instead of the openings 80, the coupling liquid may drain out around the piston 68.

With the structure of Figure 4 so far described, when oil is supplied under pressure to the chamber 70, the plates 62 and 64 are frictionally clamped together to drivably connect the shafts 50 and 56. In accordance with the present invention, the spline connection between the drum 58 and the shafts 56 comprise a spline 82 on the drum 58 interfitted with splines 84 on the shafts 56. The splines 82 and 84 are similar to the splines 24 and 26 of Figures 1 to 3 in that they permit a limited amount of relative rotation between the drum 58 and the shaft 56. Thus, the arrangement is such that, with one direction of rotation and with drive being transmitted from one of the shafts 50 or 56 to the other of these shafts, the holes 76 and 78 are in alinement so that liquid is supplied to the chamber 70 and the friction clutch 61 is engaged. However, if the driven shaft tends to overrun and becomes the driving shaft, then the holes 76 and 78 move out of alinement (as in Figure 3) to cut off the supply of liquid under pressure to the chamber 70 whereupon the chamber 70 empties and the clutch 61 is disengaged.

In Figures 1-3, upon rotation of the shaft 20, with the shaft 20 normally the driving shaft and with the coupling initially empty, the drag between the coupling members 12 and 14 is sufficient to cause rotation of the coupling member 14 to aline the passages 32 and 34 whereupon the coupling fills to drivably connect the shafts 20 and 22. If the normal direction of the drive is reversed so that the shaft 22 normally is the driving shaft, then the inertia of the coupling member 14 helps aline the passages 32 and 34 upon rotation of the shaft 22. Similarly, in Figure 4, with the shaft 50 normally the driving shaft, the usual friction drag between the clutch plates will be sufficient to cause alinement of the passages 76 and 78 to engage the clutch. Also, in Figure 4 as in Figure 1, the normal direction of the drive is reversed so that the shaft 56 is the driving shaft, then the inertia of the clutch member 58 helps aline the passages 76 and 78 upon rotation of the shaft 56.

The aforedescribed modifications both disclose a relatively simple and effective arrangement for automatically controlling the hydraulic loading of a coupling such that the coupling is loaded when the normally driving member tends to transmit torque through the coupling to the normally driven member and when said driven member tends to overrun, the coupling is automatically unloaded.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A transmission between first and second shafts; said transmission comprising a first member drivably connected to said first shaft; a second member drivably connected to said second shaft, said members being hydraulically loadable to provide a driving connection therebetween; means, in the driving connection between one of said shafts and that one of said members drivably connected thereto, providing a limited range of lost motion between extreme relative angular positions of said one shaft and said one member such that said one shaft and said one member move to one limit of said range when said first shaft tends to drive said second shaft in one rotative direction and move to the other limit of said range when said second shaft tends to drive said first shaft in said rotative direction; and means controlled by relative angular movement of said one shaft and said one member for varying the magnitude of the slip between said first and second members such that said slip is a maximum or a minimum depending on whether said one shaft and said one member are at one or the other of the limits of said range of lost motion.

2. A transmission between first and second shafts; said transmission comprising a first member drivably connected to said first shaft; a second member drivably connected to said second shaft; said members being hydraulically loadable to provide a driving connection therebetween; a passageway for the liquid hydraulically loading said members; and means for automatically opening and closing said passageway so that the magnitude of the slip between said members is a minimum when said first shaft tends to drive said second shaft in one rotative direction and said slip is a maximum when said second shaft tends to drive said first shaft in said rotative direction.

3. A transmission between a first shaft and a second shaft; said transmission comprising a first member drivably connected to said first shaft; a second member drivably connected to said second shaft; said members being hydraulically loadable to provide a driving connection therebetween; a passageway for the liquid hydraulically loading said members such that the slip between said members is dependent on the extent to which said passageway is open; and means for automatically opening and closing said passageway so that the magnitude of the slip between said members is a minimum when said first shaft tends to drive said second shaft in one rotative direction and said slip is a maximum when said second shaft tends to drive said first shaft in said rotative direction, said means including means providing lost motion in the driving connection between one of said shafts and that one of said members drivably connected thereto.

4. A transmission between first and second shafts; said transmission comprising a hydraulic coupling having a first member drivably connected to said first shaft and having a second member drivably connected to said second shaft, said hydraulic coupling members forming an annular chamber therebetween for the liquid through which torque is arranged to be transmitted between said hydraulic coupling members; means, in the driving connection between one of said shafts and that one of said hydraulic coupling members drivably connected thereto, providing a limited range of lost motion between extreme relative angular positions of said one shaft and said one hydraulic coupling member such that said one shaft and said one hydraulic coupling member move to one limit of said range when said first shaft tends to drive said second shaft in one rotative direction and move to the other limit of said range when said second shaft tends to drive said first shaft in said rotative direction; and means controlled by relative angular movement of said one shaft and said one hydraulic coupling member for varying the magnitude of the slip between said first and second hydraulic coupling members such that said slip is a maximum or a minimum depending on whether said one shaft and said one hydraulic coupling member are at one or the other of the limits of said range of lost motion.

5. A transmission between first and second shafts; said transmission comprising a hydraulic coupling comprising a first member drivably connected to one of said shafts and a second member drivably connected to the other of said shafts, said hydraulic coupling members forming an annular chamber therebetween for the liquid through which torque is arranged to be transmitted between said members; a passageway communicating with said chamber so that the quantity of liquid within said chamber depends on the extent to which said passageway is open; and means for automatically opening and closing said passageway so that the quantity of liquid in said chamber is a maximum when said first shaft tends to drive said second shaft in one rotative direction and is a minimum when said second shaft tends to drive said first shaft in said rotative direction.

6. A transmission between a first shaft and a second shaft; said transmission comprising a hydraulic coupling comprising a first member drivably connected to said first shaft and a second member drivably connected to said second shaft, said hydraulic coupling members forming an annular chamber therebetween for the liquid through which torque is arranged to be transmitted between said members; a passageway communicating with said chamber so that the quantity of liquid within said chamber depends on the extent to which said passageway is open; and means for automatically opening and closing said passageway so that the magnitude of the slip between said hydraulic coupling members is a minimum when said first shaft tends to drive said second shaft in one rotative direction and said slip is a maximum when said second shaft tends to drive said first shaft in said rotative direction, said means including means providing lost motion in the driving connection between one of said shafts and that one of said hydraulic coupling members drivably connected thereto.

GEORGE B. DU BOIS.
ROLAND B. UNGERER.

REFERENCES CITED

The following references are of record in the file of this patent:

UNITED STATES PATENTS

| Number | Name | Date |
|---|---|---|
| 1,859,607 | Sinclair | May 24, 1932 |
| 2,081,863 | Duffield | May 25, 1937 |
| 2,240,650 | Heyer | May 6, 1941 |